United States Patent [19]

Faivre

[11] Patent Number: 4,854,455
[45] Date of Patent: Aug. 8, 1989

[54] MACHINE FOR GRADING AND SORTING FISH, IN PARTICULAR FISH FROM THE SALMONIDAE FAMILY

[75] Inventor: Claude Faivre, Baume Les Dames, France

[73] Assignee: Société à Responsabilité Limitée: Establissements Faivre, Baume Les Dames, France

[21] Appl. No.: 133,382

[22] Filed: Dec. 15, 1987

[30] Foreign Application Priority Data

Dec. 15, 1986 [FR] France .................... 86 17702

[51] Int. Cl.⁴ ............................................. B07B 13/07
[52] U.S. Cl. .................................... 209/678; 198/390; 209/676; 209/933
[58] Field of Search ................ 209/660, 674, 675–679, 209/670, 906, 933, 936, 617; 198/390, 469.1, 479.1, 699.1, 725; 119/3

[56] References Cited

U.S. PATENT DOCUMENTS

| 1,041,892 | 10/1912 | Sieling | 209/677 |
|---|---|---|---|
| 1,139,714 | 5/1915 | Parker | 209/662 |
| 1,902,873 | 3/1933 | Marone | 198/728 |
| 2,244,729 | 6/1941 | Sammis et al. | 209/933 |
| 2,314,479 | 3/1943 | Christiansen | 209/620 |
| 3,204,605 | 9/1965 | Vroman | 209/676 |
| 3,508,641 | 4/1970 | Vagedes | 198/728 |
| 4,016,625 | 4/1977 | Mitchell | 209/679 |

FOREIGN PATENT DOCUMENTS

| 205329 | 5/1908 | Fed. Rep. of Germany . |
| 1151404 | 7/1963 | Fed. Rep. of Germany . |
| 1913477 | 3/1969 | Fed. Rep. of Germany . |
| 2629659 | 1/1977 | Fed. Rep. of Germany ...... 209/674 |
| 1123973 | 5/1955 | France . |
| 1273246 | 11/1960 | France . |
| 1458348 | 4/1966 | France . |
| 2278256 | 5/1975 | France . |
| 225392 | 8/1968 | U.S.S.R. ............................ 209/667 |
| 745730 | 2/1956 | United Kingdom . |
| 1261781 | 1/1972 | United Kingdom . |

Primary Examiner—Robert B. Reeves
Assistant Examiner—Donald T. Hajec
Attorney, Agent, or Firm—Bacon & Thomas

[57] ABSTRACT

The machine according to the invention comprises a channel which is:

constituted by two shaped panels giving it an open bottomed V-shaped section and which are associated with relative spacing adjustment members, provided with spraying conduits and overlapping plates closing off its top part, and associated with an endless conveyor comprising thrust bars brought successively by the conveyor in a transversal position in the channel passage section.

The machine according to the invention finds an application in the sorting and grading of fish of the Salmonidae family.

9 Claims, 3 Drawing Sheets

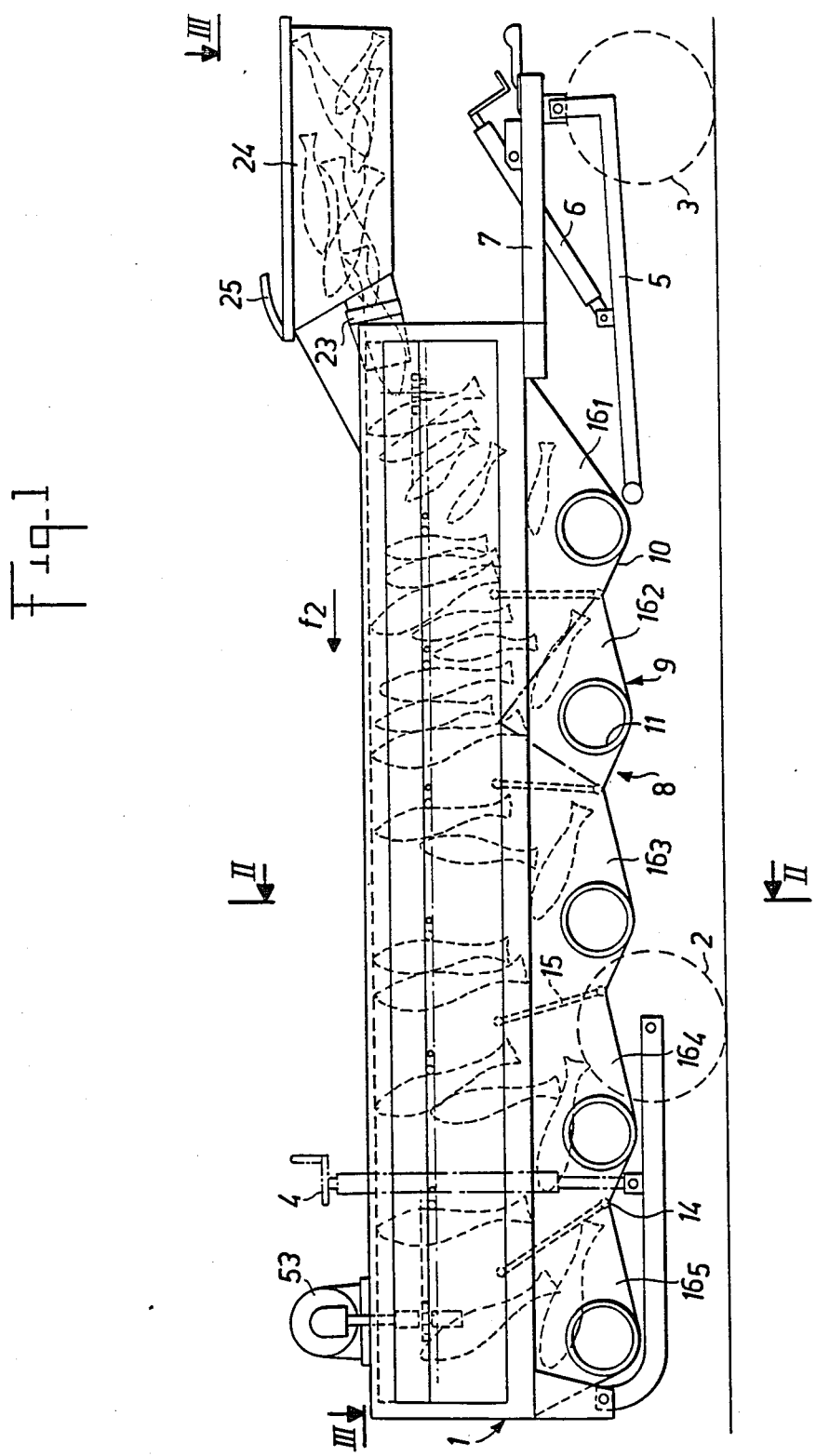

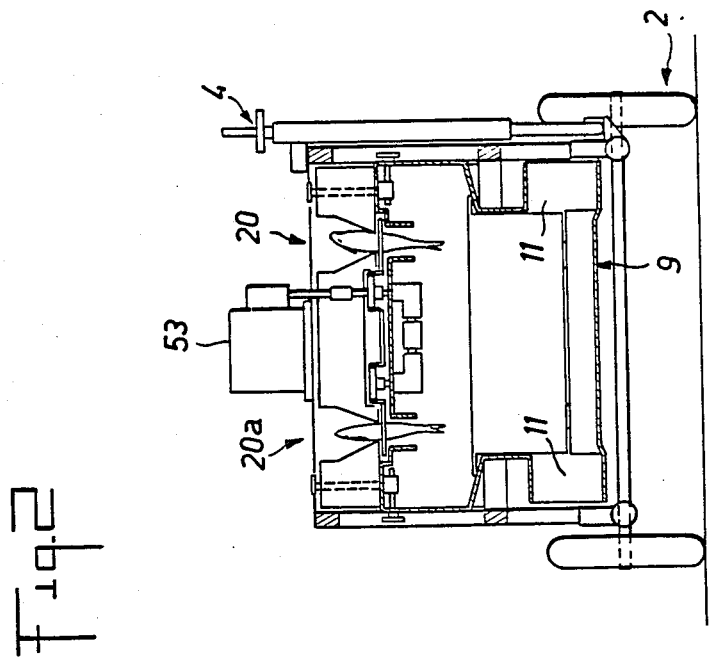

MACHINE FOR GRADING AND SORTING FISH, IN PARTICULAR FISH FROM THE SALMONIDAE FAMILY

FIELD OF THE INVENTION

The present invention relates to the field of pisciculture and more particularly to machines used for grading and sorting oblong-bodied live fish, such as for example fish from the Salmonidae family.

BACKGROUND OF THE INVENTION

Pisciculture is the breeding and culture of fish in fresh water or salt water tanks which define evolutionary volumes for a family of fish induced to develop and to grow by a daily controlled supply of food.

The growth of such fish involves controlling their size, either in order to transfer them periodically from the tanks in which a force and/or weight ratio can be established and must be maintained, or in order to comply with the requirements of their commercialization.

It is therefore necessary to be able to grade the fish issued from a tank, so as to determine their growth rate, but also in order to be able to sort them according to weight or length criteria, and thus to divide them into different predetermined categories, either to put them in tanks where they will continue to grow, or to meet subsequent commercialization requirements.

Machines for carrying out this type of work are already known and used. Most of them propose to delimit at least one grading channel, of which the open bottom section increases gradually from an inlet end towards an outlet end, in order to permit gradual selection as a function of the size of the fish admitted to go through such a channel, when the local passage section corresponds to their larger cross-section.

The fish having gone through the open bottom of the grading channel are received in transfer cases or compartments.

For the grading, the prior art proposes several embodiments of grading channel.

One solution consists in delimiting the grading channel by two flat panels, the relative spacing of which is adjustable, said panels reaching to above two substantially parallel rollers. Said rollers, of which the relative spacing is also adjustable, are driven in reverse rotation, so that a fish picked up locally between them, has a tendency to be lifted and rejected toward the top of the channel.

Normally in such a channel, the fish are held in vertical engagement, the tail facing downwardly. The reverse rotation of the rollers is selected in the direction indicated hereinabove in order to prevent the fish from being drawn in-between the rollers, which would cause them to be compressed and harm them.

In actual fact, such a machine is merely an adaptation of a machine initially designed for grading fruit. The design of that machine is ill-suited for grading live fish which are not adequately guided and carried by the rotating rollers. Therefore a suitable grading cannot be obtained.

Another known prior art machine proposes to define a grading channel, not with two rigid panels, but with two endless belts, the spacing of which can be conveniently adjusted.

The belts are driven forward, in such a way that, by their ends in facing relationship, they can push the live fish forward from the entrance end toward the exit end of the channel having the largest passage section of the open bottom.

The working principle of this particular embodiment, can be deemed to ensure, theoretically, a better guiding of the live fish. However, the driving belts are flexible members, locally subjected to vibrations or flapping movements which are not always synchronous and in-tune. Such flapping movements are responsible for significant variations of the passage section of the open bottom that they define. Therefore, the grading results are, in this case also, doubtful.

Experience has also shown that large-sized fish could bear traces of chaffing, because of the instability imposed on them by the longitudinal movement of the endless belts. And fish, which have been marked in this way, are, later on, subject to physical degradations which are detrimental to them.

The prior art further proposes another machine in which the grading channel is constituted by two panels defining an open-bottomed V-shaped channel. In such a channel, a pressing belt is driven endlessly forward longitudinally. Such a belt is provided with flexible fingers which are engaged in the channel, in such a way as to cause the fish to advance in a horizontal position until such time as the passage section of the open bottom allows them to pass through the channel.

Such a machine is satisfactory form the standpoint of the function to be carried out, but it presents certain drawbacks, due mainly to its rather complex structure. The production and maintenance costs of such a machine are higher than those of the previously described machines. Such a machine demands accurate maintenance, especially as regards the tension of the endless belts, so that the flexible fingers are suspended at the correct height and are driven forward at a speed compatible with the fish dwelling time inside the grading channel.

To sum up, therefore, the prior technique does not offer any solutions which can be regarded as completely satisfactory to carry out the grading and sorting of oblong-bodied live fish, such as fish of the Salmonidae family.

OBJECT OF THE INVENTION

It is the object of the present invention to fill in those gaps by proposing a new machine of particularly simple design which can be built at an advantageous price and requires only limited maintenance.

The present invention relates to a grading and sorting machine having a grading channel in which the fish are driven forcibly forward, in vertical orientation, with downwardly facing tails, and without being subjected to physical stresses liable to damage the protecting cover constituted by their imbricated scales, and without any risk of their being harmfully bruised.

Another object of the invention is to propose new grading and sorting means capable of being mounted on the frames of conventional machines, thereby permitting an instant practical adaptation of the existing materials.

To arrive at the aforesaid results, the fish grading and sorting machine, of the type comprising a frame, supporting at its lower part, an elongated tank, defining successive transversal compartments, each one being provided with an outlet tub and at its upper part, at least one grading channel communicating at one end with a tank receiving live fish to be graded and sorted, and extending in superposed manner, in parallel to the succession of compartments, is characterized in that comprises at least one grading channel:

constituted by two shaped panels, giving it a V-shaped open-bottomed cross-section, and which are associated to means for adjusting the relative spacing in two directions diverging from the admission tank, so as to progressively increase from the tank, the cross-section of said bottom, provided with spraying conduits and with overlapping plates closing off its upper part, and associated to an endless conveyor belt equipped with thrust bars, caused successively by the conveyor to arrive in transversal position in the channel passage section, and to follow the entire length thereof in order to drive the fish along it, which fish are engaged with downwardly facing tails, through said open bottom, and advancing in the increasing direction of the passage section of said bottom.

BRIEF DESCRIPTION OF THE DRAWINGS

The invention will be more readily understood through the following detailed description thereof, with reference to the accompanying drawings, in which:

FIG. 1 is a diagrammatical elevational cross-section of a machine according to the invention.

FIG. 2 is a cross-sectional view taken along line II—II of FIG. 1.

FIG. 3 is a plan view taken substantially along line III—III of FIG. 1.

DESCRIPTION OF THE INVENTION

Figure 4:
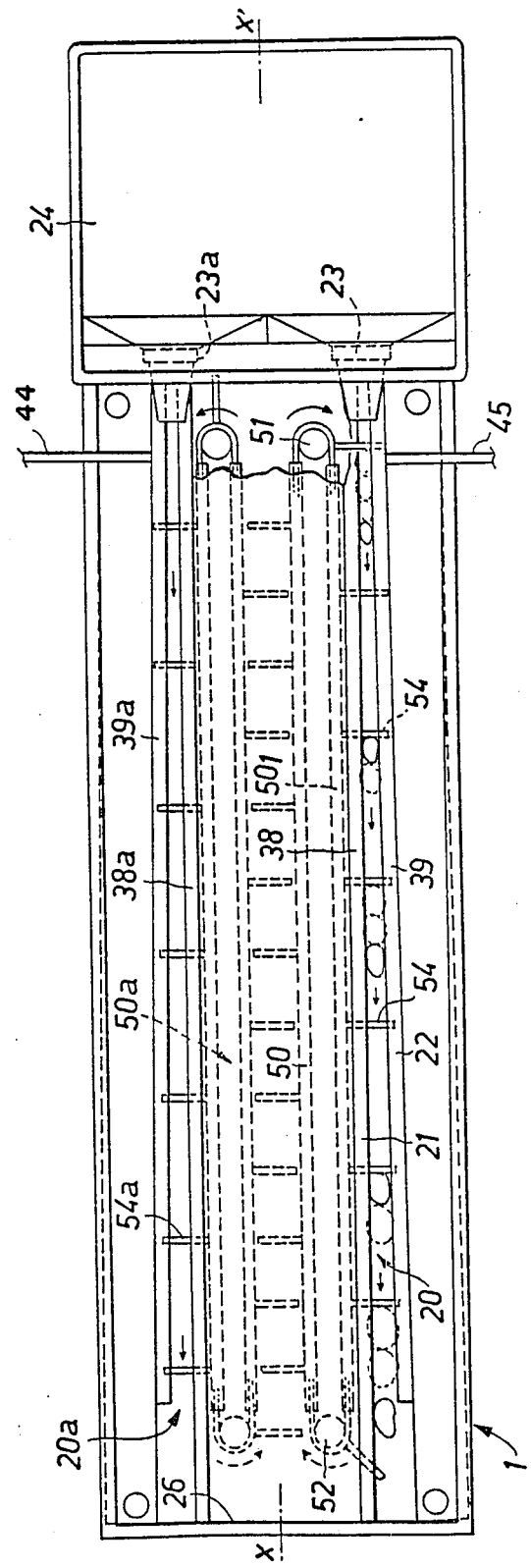
FIG. 4 is a cross-sectional view, on an enlarged scale, similar to FIG. 2, but illustrating in detail some of the elements constituting the object of the invention.
Figure 4:
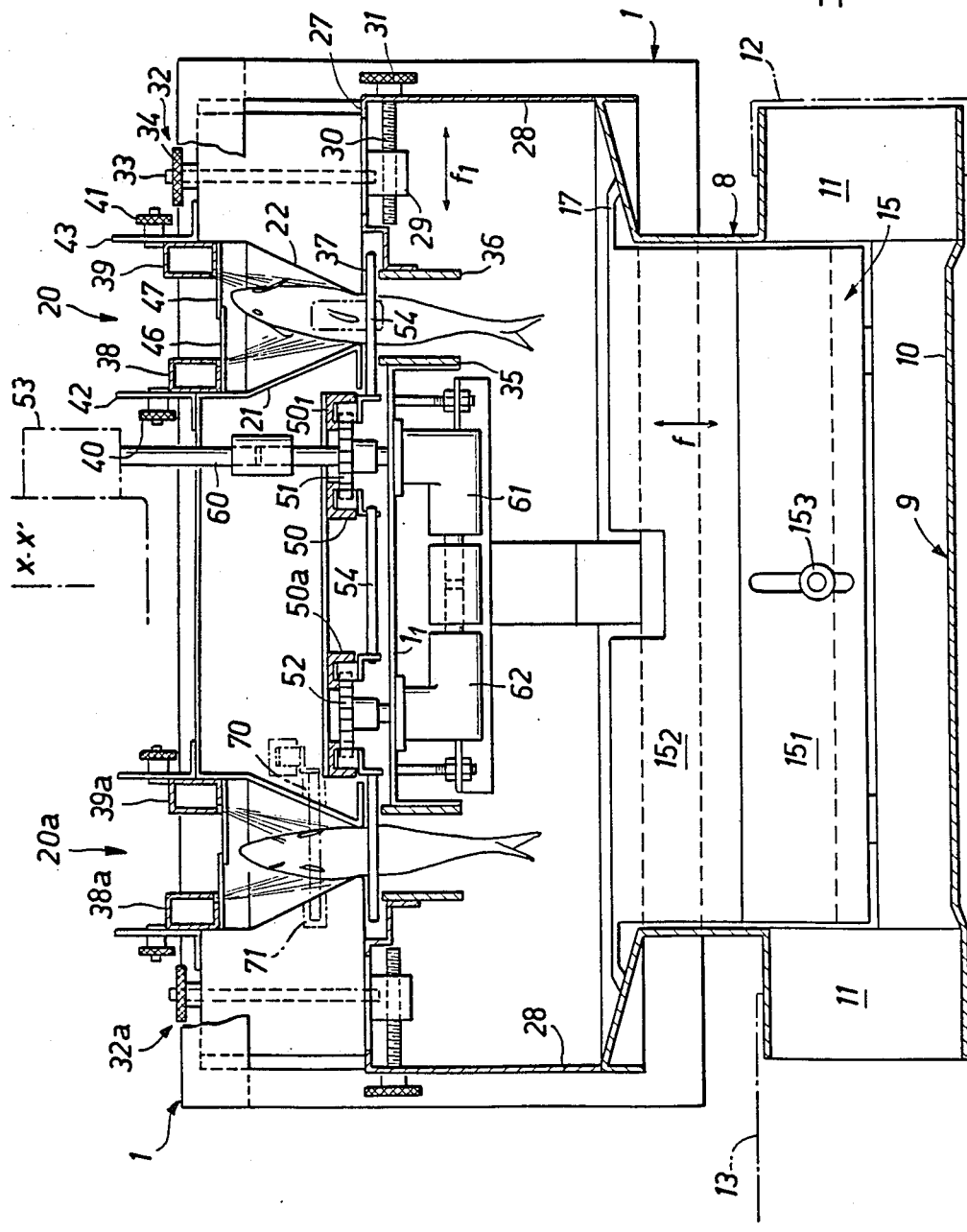

The machine for grading and sorting live fish according to the invention, comprises a frame 1 born by rolling members 2 and 3 forming two separate sets. Members 2 are preferably associated to at least one jack 4 for adjusting their height, whereas set 3 is provided with a lifting arm 5 adapted to be controlled in extension or in retraction by a screw-jack 6.

The technical means 2 to 6 make it possible for the frame 1 to roll on its own on any suitable support or ground, or else they enable a frame 1 to be placed in a horizontal stable position of immobilization, when the arm 5 rests on the ground as a substitute for the wheel 3.

Frame 1 is also preferably associated to a drawbar or the like 7, permitting the attachment of the machine to a towing member of any suitable type. The draw-bar 7 extends in parallel to the median longitudinal plane x-x' of the machine.

The frame 1 carries at its base, a tank 8 produced from any suitable material and having a bottom 9 defining successive cavities 10. Each cavity is provided with two outlet pipes 11, the axes of which are perpendicular to the plane x-x' and which are open on both sides of the tank 8. Said pipes 11, which are normally closed off by stoppers 12, can each be connected, simultaneously or selectively, to a transfer casing or channel 13.

The bottom 9 comprises substantially between the cavities 10, means 14 for articulating walls 15 rising substantially vertically in order to divide the tank 8 into as many receiving compartments or tanks 16. In the present case, the bottom 9 of the tank presents five cavities which are associated to four walls 15, permitting the delimiting in tank 8 of five successive transversal compartments $16_1$ to $16_5$. Each wall 15 is constituted by two plates $15_1$ to $15_2$ which can be adjusted for relative sliding in the double direction of arrow f via a slide guide $15_3$. Plate $15_2$ has two projecting lateral upper fingers 17 designed to rest on the top of tank 8. It is possible by controlling the slide member $15_3$ to make the wall 15 higher or shorter, which wall, by cooperating with the tank 8 and the fingers 17, can then occupy a more or less inclined position in one direction or another. This inclination adjusting possibility enables an increase or reduction of the horizontal receiving section of the compartments or tanks 16, depending on the grade sorting to be made. This possibility further permits, if necessary, to close the compartment completely, as illustrated in dash and dot lines in FIG. 1 for compartment $16_2$.

The frame 1 supports, at its upper part, at least one grading channel 20 extending in superposed manner with respect to tank 8, in parallel to plane x-x' and to the succession of different compartments $16_1$ to $16_5$. The number of grading channels 20 essentially depends on the capacity required for the machine and is not a critical or essential condition of the invention.

In the example illustrated in the drawings, the frame 1 supports in its top part, two grading channels 20 and 20a which are produced in substantially identical manner. For this reason, only the elements constituting channel 20 are described hereinafter, bearing in mind that the same elements constituting channel 20a have been given the same references with the letter a.

Channel 20 is defined by two shaped panels 21, 22, situated substantially in parallel one to the other in order to confer to the channel 20 a V-shaped section with open bottom. The shaped panels 21 and 22 are connected by one end to a transfer chute 23 communicating with a supply tank 24 fixed on one end of the frame 1. The supply tank 24 is designed to receive, in bulk, live fish to be graded and sorted and which are kept in an aqueous medium by a permanent supply of water, completed by an upper spraying ramp 25 placed substantially plumb with the inlet to the chute 23.

Shaped panels 21 and 22 are associated to means for adjusting their relative spacing, so that a grading channel 20 can be defined, which channel has an open bottomed section which increases progressively from the end connected to the chute 23 to the opposite end which is closed by a wall 26.

The means for adjusting the relative spacing preferably use a fixed-position panel 21, and a panel 22 mounted with a possibility of transversal displacement in either direction of the arrow $f_i$, on a bracket 27 formed by a right-angled bend of the top parts of lateral walls 28 of the tank 8. Shaped panel 22 is provided at its base with a nut 29 which is in permanent cooperation with a screw 30 which is controllable from the outside of wall 28 by a knurled knob 31. By operating the screw 30, in either direction, the nut 29 is moved in the corresponding direction, carrying the shaped panel 22 along therewith. Locking means 32, acting on the nut 29 is provided to locally immobilize the panel 22. The means 32 can consist in a screw 33 controllable by a knob 34 accessible from the top of the machine.

Locking and adjusting means 29 to 31, on the one hand, and 32 to 34, on the other hand, are provided in pairs, being distributed over the length of panel 22 and preferably, at least placed close to the ends of said panels, as illustrated in FIG. 4.

Guiding channel 20 is completed by two guiding skirts 35 and 36 extending, in substantially vertical manner, under panels 21 and 22 to which they are coupled in order to be respectively fixed and mobile. Skirts 35 and 36 are preferably constituted by rigid plates placed on edge. The upper longitudinal edges of plates 35 and 36 extend at a distance from the open bottom of channel 20 with which they provide a gap 37, the function of which will become evident hereinafter.

Channel 20 is moreover, associated to permanent spraying ramps 38 and 39 which are constituted by tubular conduits mounted via vertical position height adjusting members 40, 41 on flanges 42, 43 extending the shaped panels 21 and 22. Conduits 38 and 39 are connected, as illustrated in FIG. 3, to pipes 44, 45 supplying pressurized water. Conduits 38 and 39 are provided at their base with two overlapping-type plates 46 and 47, closing off the upper part of channel 20.

Besides the aforesaid grading means, the machine according to the invention is associated to means for forcibly pushing the fish into the channel 20 in the direction of arrow $f_2$ (FIG. 1). Said means comprise an endless conveyor belt 50 extending around two intermediate gear wheels 51 and 52, respectively driven and driving, carried by a central beam 11 of frame 1 on which, the fixed skirts 35 are preferably mounted. Gear wheels 51 and 52 can be constituted by chain wheels, toothed wheels or pulleys, depending on the nature of the endless conveyor 50. The driving wheel 52 is driven in rotation via a geared motor unit 53 carried by the frame 1.

Conveyor 50 is provided with thrust bars 54 extending laterally outwardly, so as to occupy a direction perpendicular to that of the parallel ends of the belts which extend between the wheels 51 and 52. Thrust bars 54 thus have a tendency to be displaced, in the direction of arrow $f_2$, while occupying a direction transversal to the grading channel 20.

The plane occupied by conveyor 50 is so selected that the thrust bars 54, belonging to the conveyor end situated adjacent to the channel 20, are caused to move into the gap 37 provided between the open bottom of channel 20 and the upper longitudinal edges of skirts 35 and 36 which constitute sliding supports on which the thrust bars 54 rest.

Thus, as illustrated in FIG. 3, the thrust bars 54 divide the volume of guiding channel 20 into a number of compartments which become mobile, advancing in the direction of arrow $f_1$ when the conveyor is set in movement. The number of internal compartments is always the same and involve the creation of a compartment which develops from the end connected to the transfer chute with, simultaneously, the disappearance of another compartment vanishing at the opposite end.

The above described machine works as explained hereafter.

The fish to be graded and sorted are dropped into the tank 24 from which they pass, through chute 23, into channel 20. Due to the shape of the panels 21 and 22, the live fish are naturally urged, with their tails facing downwardly, through the open bottom of channel 20 in which they are kept, if their larger cross-section is greater than the local passage section of channel 20. FIG. 1 shows that any fish not meeting this condition, pass freely through the local passage section of the channel 20 and fall into the tank or receiving compartment 16₁ from which they can be discharged through pipe 11, in order to be redirected to a fish-growing tank for example.

The fish are loaded in the supply tank 24 together with a permanent supply of water flowing in such a way that the fish can be kept in channel 20 and can drop into compartments 16 without being completely immersed in their natural medium, although being always kept in contact with said medium. An added water supply can be provided for each compartment 16, so that the transfer of the received graded and sorted fish can take place in quasi-total immersion.

Thrust bars 54, driven in the direction of arrow $f_2$, push the fish, engaged as indicated hereinabove, in the direction of the largest passage section of the open bottom of channel 20.

A number of fish are thus carried between two successive thrust bars 54 which cause them to advance smoothly and strainlessly, since their relative spacing is so selected as to limit the number of fish concerned.

During their advancing movement into channel 20, the fish are sprayed over by the ramps 38 and 39 which keep them in permanent contact with the liquid medium ensuring their sliding movement between panels 21 and 22. The passage section offered by the open bottom of channel 20 increases as the fish move forward. The fish, whose cross-section becomes smaller than the local passage section, go through the open bottom to be received in the subjacent tank 16.

All the fish, complying with a given grade, are thus made to go freely through the channel 20 into a specifically defined zone of the latter, so that all these fish are received in the same compartment of receiving tank 16, which tank is capable of transferring them toward the transport or growing tanks. It then becomes possible to proceed to a sorting of different grades received in the successive compartments, in each one of which the fish show a low dispersion of the selected grade. The adjustment of walls 21 and 22 is determined so that the last sorting zone, which corresponds to the tank 16₅ corresponds to the maximum fish size of the batch to be graded and sorted.

Due to the shape of panels 21 and 22, to the permanent presence of streaks or stream of spraying water, and to the thrust force exerted by the bars 54 acting by simple contact, the fish, admitted into channel 20, can be moved progressively without any risk of their being bruised or strained in a way that could affect their physical appearance. The fish are picked up by the thrust bars preferably, just below the open bottom, i.e. in a plane where the center of gravity of the fish is situated low enough, in relation to its length, to prevent any risk of tilting or turning over. A progressive movement in substantially vertical position, with the tail facing downwardly, is therefore possible for a given number of fish, even of different sizes, which occupy the same transfer compartment materialized by two successive thrust bars. Each fish is dropped in maximum guiding conditions, considering the presence of the skirts 35 and 36 extending the grading channel 20.

The function of channel 20 is therefore to ensure the grading, according to several sizes of the fish admitted at random into tank 24. The position of channel 20, above the succession of compartments 16, enables the sorting of said grades, with a view to obtaining batches of fish homogeneous in size and in weight.

In the illustrated example, the machine comprises two grading channels 20 and 20a which are associated to two conveyors 50 and 50a, arranged in parallel fashion, between channels 20 and 20a. In such a case, it may be advantageous to provide only one motor unit 53 acting, via one transmission 60, on one of the conveyors, connected with the other by way of bevel gears 61 and 62 provided on beam 11 on which are mounted the fixed skirts 35 and 35a. Conveyors 50 and 50a are then driven forward, in reverse direction, so that the active ends adjacent to channels 20 and 20 are driven forward in the same direction.

FIG. 3 shows that, in such a case, conveyors 50 and 50a are shifted of relatively half the distance between the thrust bars 54.

FIG. 4 illustrates, in dash and dot lines, and as far as the grading channel 20a is concerned, a variant embodiment wherein the thrust bars 54 move in a plane superposed to the open bottom of the channel In such a case, the fixed panel 21a is provided, throughout its length, with a passage slot 70 which coincides, within a substantially horizontal plane, with a clearance 71 resulting from the shape of the movable panel 22a.

As illustrated in the foregoing, the machine for grading and sorting live fish is of particularly simple and reliable design and can be produced for an advantageous cost price, without particularly delicate maintenance operations being required.

It is possible with the method according to the invention to produce a machine of small height, absolutely safe for the fish, which are prevented from jumping vertically by the presence of overlapping plates 46 and 47 closing off the top of the channel.

Moreover, the advancing means and the advance driving means are constituted by surfaces exerting no physical strain on the fish which are held in permanent contact with their natural liquid medium which, inside the channels, act as a sliding fluid to reduce frictions and risks of injuries.

Although this has not been shown, quite obviously, the machine according to the invention could comprise more than two channels 20 provided in even or odd numbers, and in such a case, each one arranged into a functional group, for example via a gear motor 53, a transmission 60 and conjugated means for driving the two conveyors.

Another advantage of the object of the invention resides in the possibility of adapting the principal means of the invention to existing machines.

The invention is not in any way limited to the description given hereinabove, and on the contrary covers any modifications that can be brought thereto, without departing from its scope.

What is claimed is:

1. A machine for grading and sorting fish comprising:
   (a) a frame including an upper part and a lower part;
   (b) an elongate tank supported at the lower part of the frame, the tank being defined by a plurality of successive transversal compartments along the longitudinal axis of the tank, each compartment being provided with an outlet tube;
   (c) at least one longitudinal grading channel disposed at the upper part of the frame, the channel including a passage section for advancing the fish along a given direction, an upper portion, an open lower end in communication with the compartments, sloping side walls for causing displacement of the fish with their tails directed downwardly through the open lower end, an adjustable cross-section which increases in the given direction, means for spraying fluid on the fish, and overlapping plates for closing off the upper portion to prevent the fish from jumping vertically therethrough;
   (d) a supply tank for supplying live fish to be graded and sorted, one end of the channel being in communication with the supply tank for receiving live fish therefrom; and
   (e) an endless conveyor belt associated with the channel and including a plurality of thrust bars, the thrust bars being caused to successively arrive in transversal position along the length of the passage section for advancing fish therethrough in the given direction.

2. The machine of claim 1 wherein the channel further includes a fixed panel, a movable panel, and means for adjusting the movable panel in a spaced relationship with respect to the fixed panel.

3. The machine of claim 2 wherein each panel includes a guiding skirt extending downwardly therefrom and forming a continuation thereof, the skirts being disposed in a spaced relationship that is adjustable by the means for adjusting the spaced relationship of the panels.

4. The machine of claim 3 wherein the thrust bars of the conveyor are disposed for movement between the open lower end of the channel and the skirts.

5. The machine of claim 2 wherein each panel includes a means for adjusting the height of the panel, the means for spraying fluid on the fish includes a conduit mounted on each panel by the height adjusting means, and each conduit includes a base associated with an overlapping plate.

6. The machine of claim 2 wherein the fixed panel includes a slot formed therein, the movable panel includes a housing clearance formed therein, the slot and the housing clearance being disposed in a common plane above the open lower end of the channel, and the thrust bars being disposed within the channel for movement through the slot and housing clearance.

7. The machine of claim 2 further including a central beam, the conveyor belt and the fixed panels being carried by the central beam.

8. The machine of claim 1 further including two grading channels disposed in parallel, two conveyor belts disposed between and separating the channels, and a driving member provided with two beveled gears for driving the two conveyor belts forwardly and in opposite directions.

9. The machine of claim 1 wherein the compartments are partially defined by walls adjustable in height and inclination.

* * * * *